(12) United States Patent
Wang

(10) Patent No.: US 9,485,777 B2
(45) Date of Patent: Nov. 1, 2016

(54) SYSTEMS AND METHODS FOR SCHEDULING WIRELESS COMMUNICATIONS

(71) Applicant: QUALCOMM Incorporated, San Diego, CA (US)

(72) Inventor: Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 13/843,444

(22) Filed: Mar. 15, 2013

(65) Prior Publication Data

US 2014/0269540 A1    Sep. 18, 2014

Related U.S. Application Data

(60) Provisional application No. 61/785,569, filed on Mar. 14, 2013.

(51) Int. Cl.
*H04W 4/00* (2009.01)
*H04W 72/12* (2009.01)

(52) U.S. Cl.
CPC .................. *H04W 72/1215* (2013.01)

(58) Field of Classification Search
CPC ............... H04W 72/1215; H04W 72/1278
USPC ........................................... 370/329
See application file for complete search history.

(56) References Cited

U.S. PATENT DOCUMENTS

| | | | |
|---|---|---|---|
| 2002/0132585 A1* | 9/2002 | Palermo | H04B 5/02 455/41.1 |
| 2004/0180696 A1 | 9/2004 | Foore et al. | |
| 2007/0032241 A1* | 2/2007 | Busch | H04B 7/022 455/450 |
| 2010/0027525 A1* | 2/2010 | Zhu | H04W 48/16 370/350 |
| 2010/0029325 A1* | 2/2010 | Wang et al. | 455/553.1 |
| 2010/0061326 A1 | 3/2010 | Lee et al. | |
| 2011/0317608 A1 | 12/2011 | Li et al. | |
| 2012/0257519 A1* | 10/2012 | Frank et al. | 370/252 |
| 2012/0263117 A1* | 10/2012 | Love et al. | 370/329 |
| 2012/0314598 A1* | 12/2012 | Sadek et al. | 370/252 |
| 2013/0324112 A1* | 12/2013 | Jechoux | H04W 88/06 455/426.1 |
| 2014/0247732 A1* | 9/2014 | Yang et al. | 370/252 |

* cited by examiner

*Primary Examiner* — Gerald Smarth
(74) *Attorney, Agent, or Firm* — Paradice and Li LLP

(57) ABSTRACT

This disclosure provides coexistence strategies for a combined wireless communications device using multiple wireless protocols, such as WLAN and LTE. One or more periods having increased interference potential during an upcoming communication event of one wireless protocol may be identified and the transmission duration of another wireless protocol may be dynamically adjusted to reduce interference. In one aspect, a first period of potential interference during an upcoming LTE transmission may be predicted based on allocated LTE transmission power. The duration of the transmission may be adjusted so that a response to the transmission does not arrive during the first period. In another aspect, a second period of potential interference during an upcoming LTE reception may be predicted based on an estimated quality of LTE reception. The duration of the transmission may be adjusted so that the transmission does not being during the second period.

32 Claims, 6 Drawing Sheets

SYSTEMS AND METHODS FOR SCHEDULING WIRELESS COMMUNICATIONS

RELATED APPLICATIONS

The present application claims priority of provisional patent application Ser. No. 61/785,569 filed Mar. 14, 2013.

FIELD OF THE PRESENT DISCLOSURE

The present disclosure generally relates to wireless communications and more particularly relates to systems and methods for enhancing the coexistence of wireless local area network (WLAN) and long term evolution (LTE) networks.

BACKGROUND

Wireless communications devices may have multiple wireless communication systems configured to support multiple wireless protocols to gain flexibility, to provide enhanced capabilities and to exploit different advantages that may be presented by the respective protocols. Despite these advantages, the presence of multiple wireless communications systems in a single device may pose coexistence issues. For example, the use of multiple radio frequency (RF) transceivers raises the potential for one system to interfere with the transmission or reception of another system.

In one aspect, a device may provide wireless wide area network (WWAN) capabilities using cellular-based communications such as Long Term Evolution (LTE) and provide wireless local area network (WLAN) capabilities using Institute for Electrical and Electronic Engineers (IEEE) 802.11-based communications or wireless personal area network (WPAN) capabilities using systems such as BLUETOOTH® ("Bluetooth") systems conforming to standards established by the Bluetooth Special Interest Group (Bluetooth—SIG). However, depending on the frequency used by the LTE system, there may exist the potential for interference with the WLAN or WPAN system. Notably, the use of bands 7, 38, 40 and 41 by the LTE system may generate significant interference in a wireless protocol using the 2.4 GHz Industrial, Scientific and Medical (ISM) frequency band.

Accordingly, it would be desirable to provide coexistence strategies for a wireless communications device operating using multiple wireless protocols. It would also be desirable to dynamically control operation of one wireless protocol based on operational characteristics of another wireless protocol to help prevent or reduce interference. As described below, this disclosure achieves these and other goals.

SUMMARY

This disclosure is directed to systems and methods for providing coexistence between a first wireless protocol and a second wireless protocol. For example, a wireless communications device may include a first transceiver configured to operate using a first wireless protocol, a second transceiver configured to operate using a second wireless protocol, and a coexistence manager configured to receive an allocation of network resources using the first transceiver, identify a first period of potential interference regarding an upcoming transmission using the first transceiver based, at least in part, on at least one characteristic determined from the allocation of network resources, and adjust a transmission duration of the second transceiver so that a response triggered by the transmission does not arrive during the first period.

In one aspect, the at least one characteristic may be an allocated transmission power of the first transceiver. Further, the coexistence manager may identify the first period corresponding to an uplink subframe having an allocated transmission power greater than a predetermined threshold. Additionally, the allocation of network resources may be a resource block (RB) assignment.

In another aspect, the coexistence manager may predict quality of reception using the first transceiver, identify a second period of potential interference regarding an upcoming reception using the first transceiver when the predicted quality of reception is below a predetermined threshold, and adjust the transmission duration of the second transceiver so that the transmission does not begin during the second period. Further, prediction of quality of reception may be based, at least in part, on at least one of a transmission power of the second transceiver and a receive performance metric of the first transceiver. Additionally, the coexistence manager may identify the first period when the allocation of network resources indicates operation of the first transceiver on one frequency band of a first set of frequency bands associated with potential for interference and may identify the second period when the allocation of network resources indicates operation of the first transceiver on one frequency band of a second set of frequency bands associated with potential for interference, wherein the first set and the second set each include at least one frequency band. As desired, the second set of frequency bands may be a subset of the first set of frequency bands.

In one aspect, the first wireless protocol may be a long term evolution (LTE) protocol and the second wireless protocol may be a wireless local area network (WLAN) protocol. Notably, the coexistence manager may adjust the transmission duration of the second transceiver by varying a number of aggregated frames in the transmission.

This disclosure also includes methods for providing coexistence between a first wireless protocol and a second wireless protocol. For example, a suitable method may include receiving an allocation of network resources using the a first transceiver configured to operate using the first wireless protocol, identifying a first period of potential interference regarding an upcoming transmission using the first wireless protocol based, at least in part, on at least one characteristic determined from the allocation of network resources, and adjusting a transmission duration of the second wireless protocol so that a response triggered by the transmission does not arrive during the first period.

In one aspect, the at least one characteristic may be an allocated transmission power of the first transceiver. Further, the first period may be identified as corresponding to an uplink subframe having an allocated transmission power greater than a predetermined threshold. Additionally, the allocation of network resources may be a resource block (RB) assignment.

In another aspect, a suitable method may also include predicting quality of reception using the first transceiver, identifying a second period of potential interference regarding an upcoming reception using the first transceiver when the predicted quality of reception is below a predetermined threshold, and adjusting the transmission duration of the second transceiver so that the transmission does not begin during the second period. Further, prediction of quality of reception may be based, at least in part, on at least one of a transmission power of the second transceiver and a receive performance metric of the first transceiver. Additionally, the first period may be identified when the allocation of network resources indicates operation of the first transceiver on one frequency band of a first set of frequency bands associated with potential for interference and the second period may be identified when the allocation of network resources indicates operation of the first transceiver on one frequency band of a second set of frequency bands associated with potential for interference, wherein the first set and the second set each include at least one frequency band. As desired, the second set of frequency bands may be a subset of the first set of frequency bands.

In one aspect, the first wireless protocol may be a long term evolution (LTE) protocol and the second wireless protocol may be a wireless local area network (WLAN) protocol. Notably, the transmission duration of the second transceiver may be adjusted by varying a number of aggregated frames in the transmission.

This disclosure also includes a non-transitory processor-readable storage medium for providing coexistence between a first wireless protocol and a second wireless protocol in a wireless communications device, the processor-readable storage medium having instructions thereon, when executed by a processor, to cause the wireless communications device to receive an allocation of network resources using the a first transceiver configured to operate using the first wireless protocol, identify a first period of potential interference regarding an upcoming transmission using the first wireless protocol based, at least in part, on at least one characteristic determined from the allocation of network resources, and adjust a transmission duration of the second wireless protocol so that a response triggered by the transmission does not arrive during the first period.

In one aspect, the at least one characteristic may be an allocated transmission power of the first transceiver. Further, the first period may be identified as corresponding to an uplink subframe having an allocated transmission power greater than a predetermined threshold. Additionally, the allocation of network resources may be a resource block (RB) assignment.

In another aspect, the storage medium may also include instructions to cause the wireless communications device to predict quality of reception using the first transceiver, identify a second period of potential interference regarding an upcoming reception using the first transceiver when the predicted quality of reception is below a predetermined threshold, and adjust the transmission duration of the second transceiver so that the transmission does not begin during the second period. Further, prediction of quality of reception may be based, at least in part, on at least one of a transmission power of the second transceiver and a receive performance metric of the first transceiver. Additionally, the first period may be identified when the allocation of network resources indicates operation of the first transceiver on one frequency band of a first set of frequency bands associated with potential for interference and the second period may be identified when the allocation of network resources indicates operation of the first transceiver on one frequency band of a second set of frequency bands associated with potential for interference, wherein the first set and the second set each include at least one frequency band. As desired, the second set of frequency bands may be a subset of the first set of frequency bands.

In one aspect, the first wireless protocol may be a long term evolution (LTE) protocol and the second wireless protocol may be a wireless local area network (WLAN) protocol. As desired, the transmission duration of the second transceiver may be adjusted by varying a number of aggregated frames in the transmission.

This disclosure may also include a wireless communications device having a first transceiver configured to operate using a first wireless protocol, a second transceiver configured to operate using a second wireless protocol, means for receiving an allocation of network resources using the first transceiver, means for identifying a first period of potential interference regarding an upcoming transmission using the first transceiver based, at least in part, on at least one characteristic determined from the allocation of network resources, and means for adjusting a transmission duration of the second transceiver so that a response triggered by the transmission does not arrive during the first period. Further, the wireless communications device may include means for predicting quality of reception using the first transceiver, means for identifying a second period of potential interference regarding an upcoming reception using the first transceiver when the predicted quality of reception is below a predetermined threshold, and means for adjusting the transmission duration of the second transceiver so that the transmission does not begin during the second period.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which.

DETAILED DESCRIPTION

Figure 1:
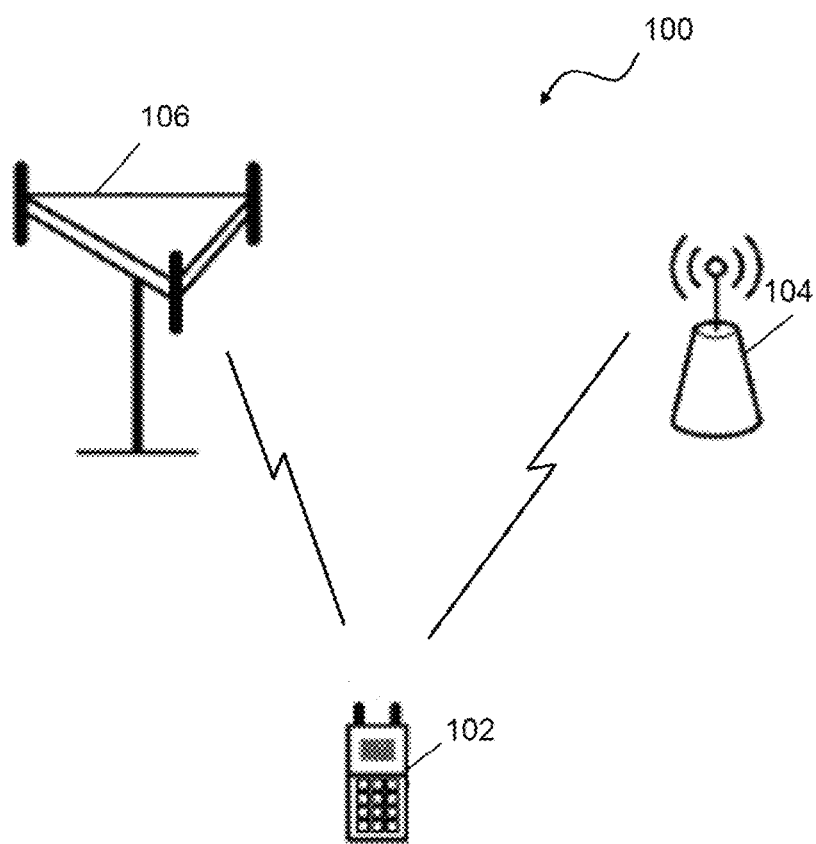
FIG. 1 schematically depicts a wireless environment including communication using multiple wireless protocols, according to one embodiment of the invention.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

The terms second level and first level, high and low and 1 and 0, as used in the following description may be used to describe various logic states as known in the art. Particular voltage values of the second and first levels are defined arbitrarily with regard to individual circuits. Furthermore, the voltage values of the second and first levels may be defined differently for individual signals such as a clock and a digital data signal. Although specific circuitry has been set forth, it will be appreciated by those skilled in the art that not all of the disclosed circuitry is required to practice the invention. Moreover, certain well known circuits have not been described, to maintain focus on the invention. Similarly, although the description refers to logical "0" and logical "1" or low and high in certain locations, one skilled in the art appreciates that the logical values can be switched, with the remainder of the circuit adjusted accordingly, without affecting operation of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus or user agent. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to a base station. A base station may be utilized for communicating with one or more wireless nodes and may be termed also be called and exhibit functionality associated with an access point, node, Node B, evolved NodeB (eNB) or other suitable network entity. A base station communicates over the air-interface with wireless terminals. The communication may take place through one or more sectors. The base station may act as a router between the wireless terminal and the rest of the access network, which may include an Internet Protocol (IP) network, by converting received air-interface frames to IP packets. The base station may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

As noted above, aspects of this disclosure are related to the use of multiple wireless protocols in a wireless communications device. Although the increase in flexibility and capability associated with the use of multiple wireless protocols is desirable, various types of conflicts may exist depending upon the technologies being used. For example, the 2.4 GHz ISM frequency band is utilized by a variety of technologies, including several wireless communication systems. In one aspect, a WLAN protocol conforming to the 802.11 family of standards may operate in the 2.4 GHz band. In another aspect, a WPAN protocol such as a Bluetooth protocol may operate in the 2.4 GHz band. Potential for interference may exist between communications systems that operate in the same band as well as between systems operating on adjacent frequencies. For example, a WWAN system such as LTE may operate on bands 40, 41 and 38 when in a time division duplex (TDD) mode or on band 7 when in frequency division duplex (FDD) mode. Notably, minimal guard bands may exist between such LTE bands and the ISM band. In one example, a 1 MHz guard band exists between band 40 and the ISM band. In another example, a 20 MHz guard band exists between band 7 and the ISM band. LTE bands 38 and 41 have a similar adjacency.

As a result of the reduced isolation between the noted LTE bands and the ISM band, transmissions associated with one wireless protocol may cause interference by desensitizing the receiver of another wireless protocol. Accordingly, embodiments of the present disclosure include identifying a period having increased interference potential during an upcoming communication event of one wireless protocol and dynamically adjusting a transmission duration of another wireless protocol.

To help illustrate aspects of this disclosure related to reducing the effects of IMD, a representative example of a wireless environment 100 is depicted in FIG. 1. In this simplified embodiment, a wireless communications device 102 having multiple radio access technologies (RATs) operates using multiple wireless protocols to communicate with base station 104, using a first wireless protocol, such as LTE, and with access point 106 using a second wireless protocol, such as WLAN or Bluetooth. In other embodiments, suitable wireless protocols may include code division multiple access (CDMA) networks, high speed packet access (HSPA (+)), high-speed downlink packet access (HSDPA), global system for mobile communications (GSM), enhanced data GSM environment (EDGE), WiMax®, ZigBee®, wireless universal serial bus (USB), and the like.

Figure 2:
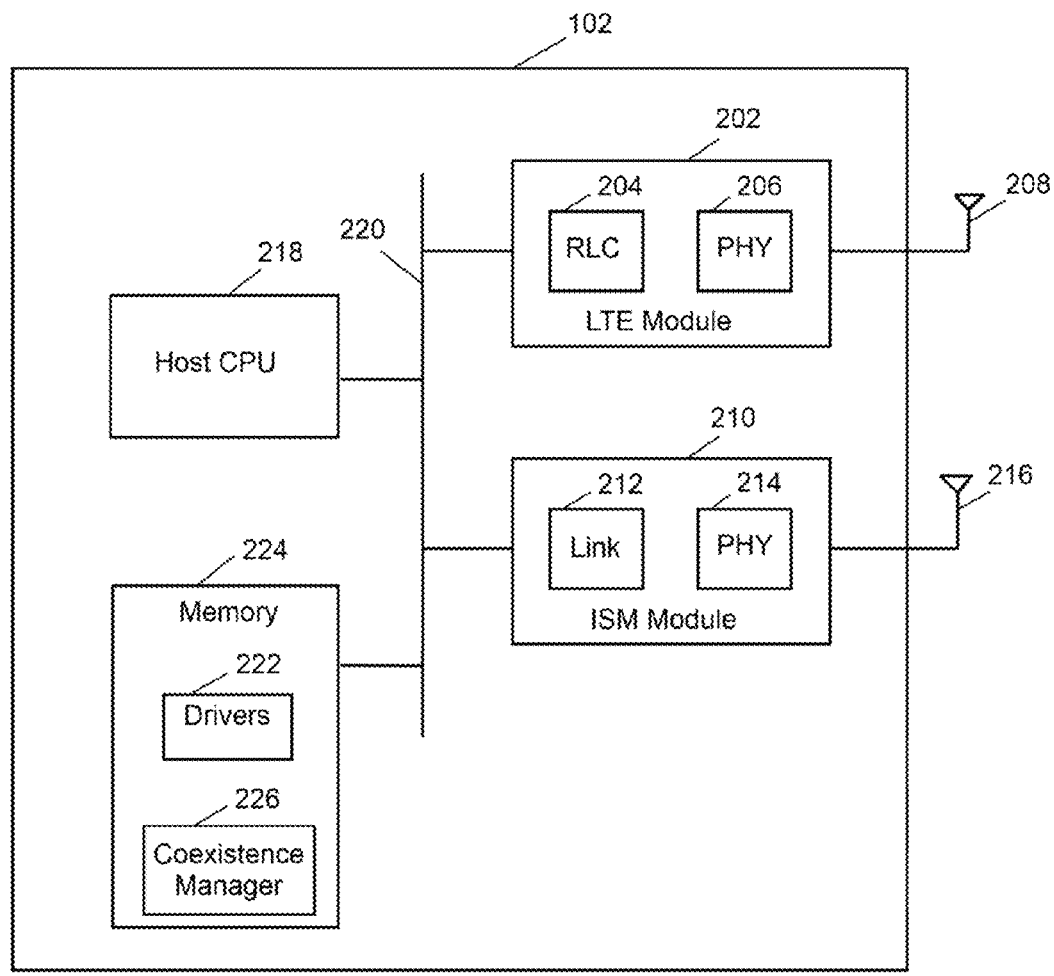
FIG. 2 schematically depicts functional blocks of a wireless communications device configured to provide coexistence between multiple wireless protocols, according to one embodiment of the invention.

FIG. 2 depicts functional blocks of wireless communications device 102 associated with the reception and transmission of signals using the wireless protocols. Generally, wireless communications device 102 may employ an architecture in which the lower levels of the wireless protocol stack are implemented through firmware and/or hardware in respective RAT modules. As shown, LTE module 202 implements a data link layer and controls access to the wireless medium through radio link controller (RLC) 204 which may be configured to perform functions related to the handling and processing of frames of data including verification, acknowledgment, routing, formatting and the like. Incoming and outgoing frames are exchanged between RLC 204 and physical layer (PHY) 206. Together, RLC 204 and PHY 206 modulate frames of information according to the LTE protocol and provide the analog processing and RF conversion necessary to transmit and receive wireless signals through antenna 208. Analogously, ISM module 210 operates according to a suitable wireless protocol such as WLAN or Bluetooth in the 2.4 GHz ISM band. ISM module 210 may include a data link 212 layer and PHY 214, which may transmit and receive signals through antenna 216.

LTE module 202 and ISM module 210 may be collocated on a common system, e.g., on the same circuit board or on distinct circuit boards within the same system, or may be embedded on the same integrated circuit as in a system on a chip (SoC) implementation. For illustration purposes only, one antenna is shown for each RAT, but wireless communications device 102 may include multiple antennas for each RAT as desired, such as to enable the use of multiple streams. Further, wireless communications device 102 may be configured to share any number of antennas between the RATs using conventional antenna switching techniques.

Wireless communications device 102 may also include host processor (CPU) 218 configured to perform the various computations and operations involved with the functioning of wireless communications device 102. CPU 218 is coupled to LTE module 202 and ISM module 210 through bus 220, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the ISM and LTE systems may be implemented in software as Drivers 222 stored in memory 224 that may be accessed by CPU 218 over bus 220.

As shown, wireless communications device 102 may include coexistence manager 226, which in this embodiment is implemented as processor-readable instructions stored in memory 224 that may be executed by CPU 218 to coordinate operation of LTE module 202 and ISM module 210. It should be noted that coexistence manager may be implemented in other ways, including but not limited to, hardware, firmware, or a combination of hardware and the processor-readable instructions. According to aspects described below, coexistence manager 226 may be configured to determine characteristics of transmission and reception regarding LTE module 202. Coexistence manager 226 may also be configured to determine characteristics of transmission and reception regarding ISM module 210. In response to one or more of these determinations, coexistence manager 226 may adaptively adjust a transmission duration of ISM module 210 to reduce performance degradation.

As discussed above, coexistence manger 226 may predict one or more periods of potential interference during an upcoming LTE communication event based on operating conditions of LTE module 202 and ISM module 210. In one aspect, a first period of potential interference due to ISM victim interference may be predicted based on a scheduled uplink transmission frequency and a scheduled LTE transmission power associated with LTE module 202. For example, coexistence manager 226 may identify that a scheduled LTE transmission is on a band associated with increased interference potential, including bands 7, 38, 40 and 41. Further, coexistence manager 226 may determine that the scheduled LTE transmission may be sent at a transmission power exceeding a predetermined threshold. As desired, the threshold may be determined during device testing, a calibration routine or in any other suitable manner. Further, the threshold may be adjusted depending upon use case or other criteria. Upon predicting the first period of potential interference during an upcoming LTE transmission due to ISM victim interference, coexistence manager 226 may adjust a transmission duration of ISM module 210 to avoid receiving a response with ISM module 210 during the first period.

In another aspect, coexistence manager 226 may predict a second period of potential interference during an upcoming LTE communication event due to ISM aggressor interference. The potential interference may be predicted based, at least in part, on a scheduled downlink transmission frequency and characteristics including the transmission power of ISM module 210 and an LTE performance indicator, such as the receive signal strength indication (RSSI), the signal to noise ratio (SNR), the receive error vector matrix (EVM), the packet error rate (PER), or any other suitable metric. For example, coexistence manager 226 may identify that a scheduled LTE transmission is on a band associated with increased interference potential, including bands 7, 38, 40 and 41, or that the scheduled LTE transmission is on a subset of those bands, such as band 40 or another frequency associated with a reduced guard band. As desired, predetermined thresholds as described above may be established for the transmission power and for the LTE performance indicator being employed such that the period of potential interference may be determined when one or both meet the thresholds. Upon predicting the second period of potential interference during an upcoming LTE transmission due to ISM aggressor interference, coexistence manager 226 may adjust a transmission duration of ISM module 210 to avoid transmitting with ISM module 210 during the second period.

The techniques of this disclosure may include determining characteristics of one or more upcoming LTE communication events. LTE communications, such as between wireless communications device 102 and base station 104, which may also be known as an evolved Node B (eNB), involve the exchange of packets at frequencies and timings arbitrated by base station 104, and may be based upon information regarding channel conditions as reported by wireless communications device 102. Base station 104 includes a protocol stack having elements corresponding to the LTE protocol stack implemented in wireless communications device 102 through WLAN module 210 and CPU 218. In one aspect, the LTE protocol stack of base station 104 may be configured to distribute network resources among associated clients, including, e.g., wireless communications device 102.

Figure 3:
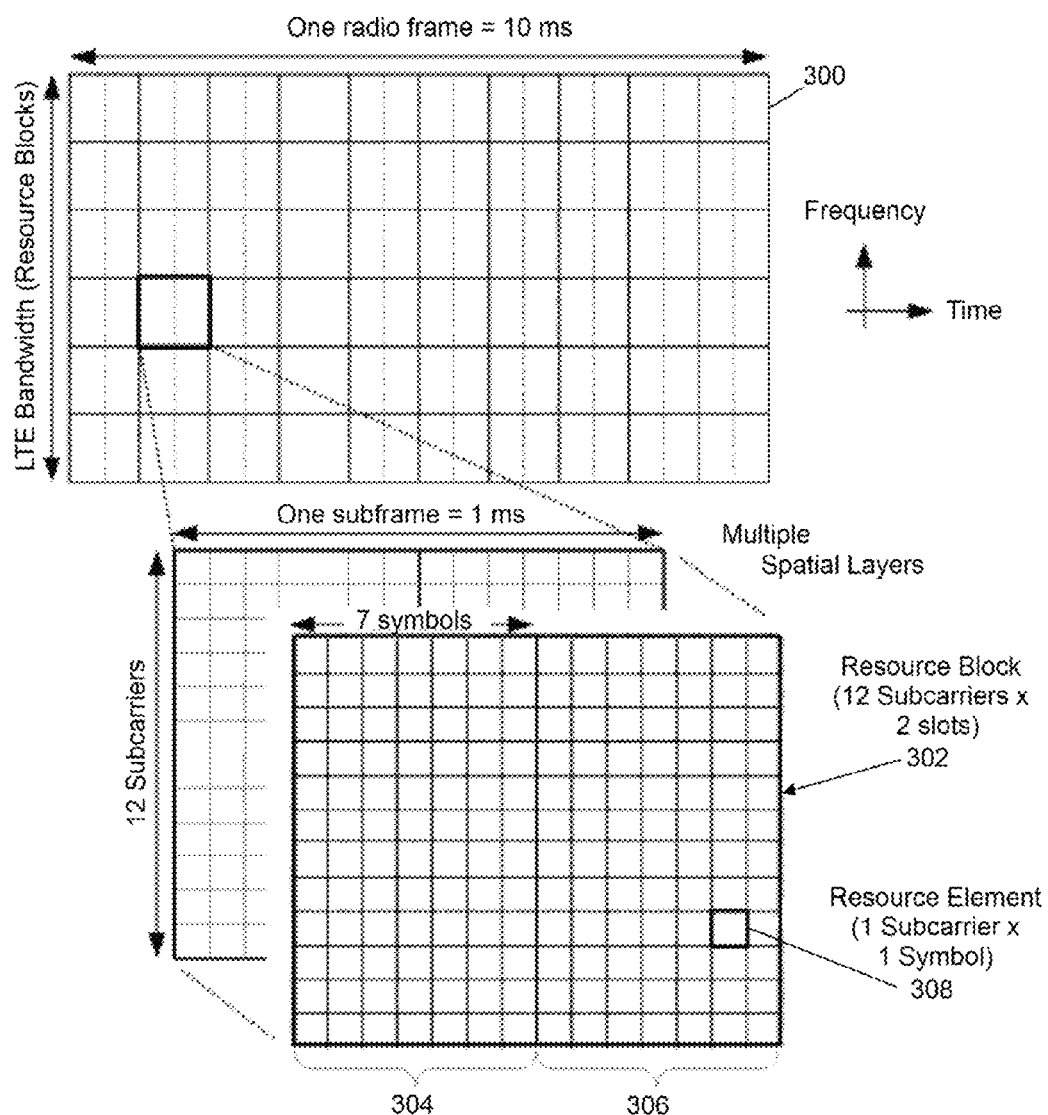
FIG. 3 is a schematic representation of a format of an LTE radio frame.

FIG. 3 depicts a representation of basic time-frequency design of LTE.

Network time and frequency resources may be expressed in terms of resource blocks (RBs), which may occupy one subframe (1 ms) in the time domain and 12 contiguous orthogonal frequency division multiplex (OFDM) subcarriers for downlink transmissions on the downlink at 15 KHz intervals and 12 contiguous single-carrier, frequency division multiple access (SC-FDMA) signals on the uplink (also at 15 KHz intervals). As a result, each RB spans a 180 KHz bandwidth. As shown in FIG. 3, radio frame 300 may have a duration of 10 milliseconds (ms) and span a number of RBs 302 in the frequency domain and ten 1 ms subframes in the time domain. The total number of RBs used for any LTE transmission is proportional to the system bandwidth. For example, a 5 MHz system bandwidth requires 25 RBs; while a 10 MHz system bandwidth requires 50 RBs (each transmission bandwidth includes upper and lower guard bands).

The minimum system bandwidth currently specified for LTE Rel-8 is 1.4 MHz (6 RBs), as illustrated in FIG. 3, and the maximum currently specified transmission bandwidth is 20 MHz (110 RBs). Please note that the techniques of this disclosure may be adapted to any changes in these specifications (or for other technologies), and should not be limited through the current example.

Each RB 302 may be divided into two slots, such as slot 304 and slot 306, and each slot may span 6 or 7 OFDM symbols on the downlink or SC-FDMA symbols on the uplink (7 symbols shown in FIG. 3). The smallest unit of resource is a resource element (RE) 308, which spans one subcarrier in the frequency domain and 1 symbol in the time domain. The number of bits per symbol is a function of the modulation scheme and may vary from 2 bits per symbol using quadrature phase shift keying (QPSK) modulation to 6 bits per symbol at 64-state quadrature amplitude modulation (64 QAM). In some transmission modes, resources may be spatially multiplexed in two of more layers as indicated.

Accordingly, during operation of wireless communications device 102, RBs may be allocated by base station 104 for an upcoming communication event, such as an uplink transmission, from wireless communications device 102. For example, resource allocation for the physical uplink shared channel (PUSCH), also known as uplink scheduling grants, to be used for the upcoming uplink transmission may be controlled by information transmitted using physical downlink control channels (PDCCHs) and may extend over substantially the entire LTE bandwidth. Such allocations may be assigned at least approximately 2 ms before the uplink transmission. Thus, coexistence manager 226 may determine characteristics regarding a scheduled uplink or downlink transmission at LTE module 202, including the transmission power and transmission frequency. As described herein, coexistence manger 226 may then use the determined characteristics regarding the upcoming LTE communication event to predict one or more periods of potential interference and adjust a transmission duration of ISM module 210 to reduce performance degradation.

Figure 4:
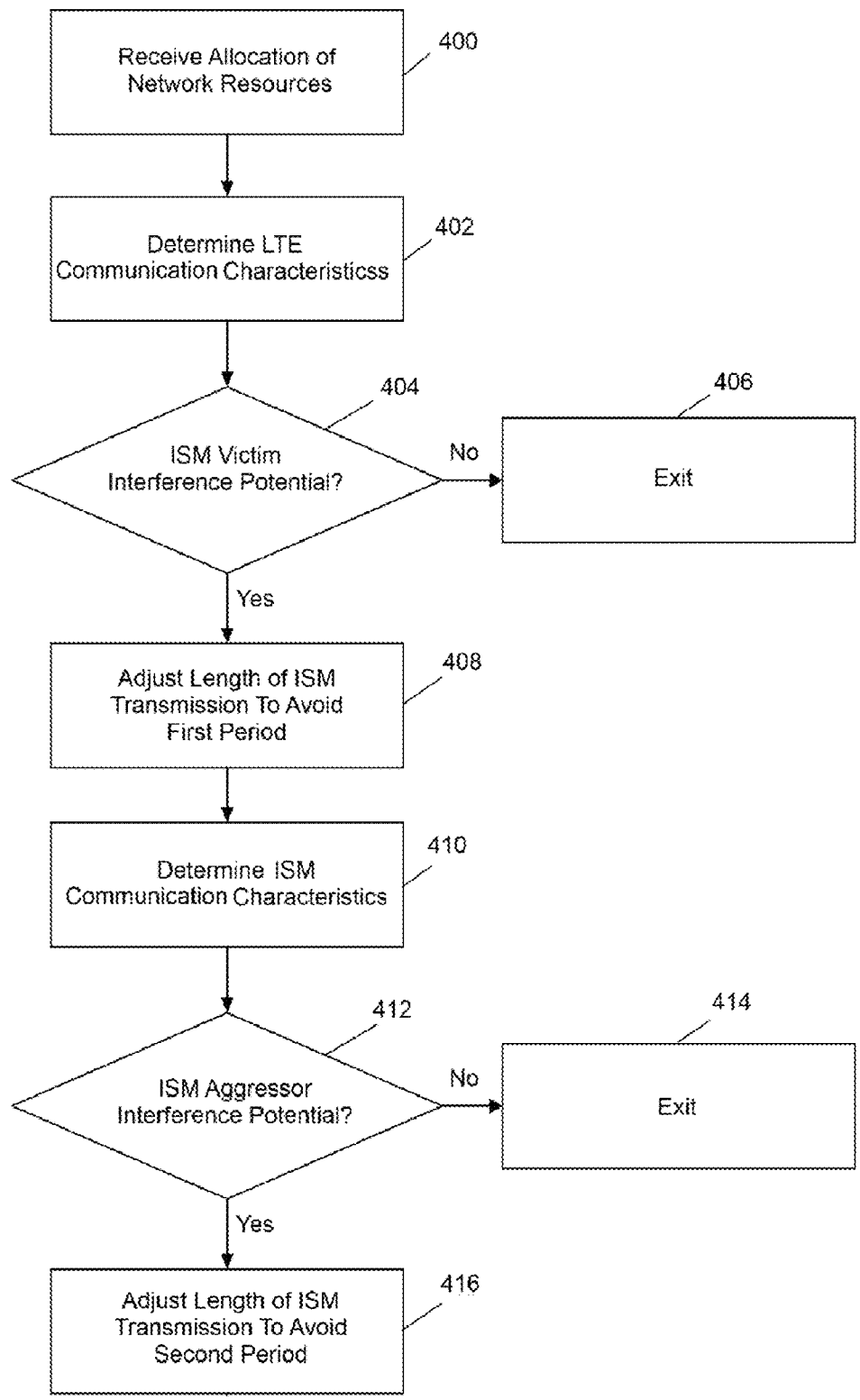
FIG. 4 is a flowchart showing an exemplary routine for predicting potential interference and adjusting transmission duration, according to one embodiment.

FIG. 4 depicts one example for dynamically adjusting a transmission duration of ISM module 210. Coexistence manager 226 of wireless communications device 102 may be configured to begin the routine to predict potential interference at 400 by receiving an allocation of network resources from base station 104, such as in the form of an RB allocation for an upcoming communication event. Based on the network resource allocation, coexistence manager 226 may determine characteristics of an upcoming uplink transmission or downlink reception in 402. As represented by 404, coexistence manager 226 may then predict a first period of potential interference due to ISM victim interference based on a scheduled uplink transmission frequency and a scheduled LTE transmission power. As noted, coexistence manager 226 may identify that a scheduled LTE transmission is on a band associated with potential interference, for example one of the bands 7, 38, 40 and 41. In 404, coexistence manager 226 may also determine that the transmission power assigned during RB allocation exceeds the predetermined threshold. If neither condition is met, the routine may exit as indicated by 406. Otherwise, coexistence manager identifies a first period of potential interference due to ISM victim interference. Accordingly, in 408, coexistence manager 226 may adjust the duration of a transmission by ISM module 210 to avoid receiving a response to the transmission during the first period. The response may be any communication triggered by the transmission of ISM module 210, such as an acknowledgment.

While the example may end at 408 as an embodiment of the disclosure, in another embodiment, an additional adjustment to the transmission duration may be made (410-416). As shown, the routine may continue to 410, such that coexistence manager 226 determines current characteristics of communications using ISM module 210, such as transmission power. Next, coexistence manager 226 may predict a second period of potential interference during an upcoming LTE communication event due to ISM aggressor interference in 412. As discussed above, the potential interference may be predicted based, at least in part, on factors including a scheduled downlink transmission frequency and an LTE performance indicator, such as RSSI, as may be determined in 402, and characteristics including the transmission power of ISM module 210. For example, coexistence manager 226 may identify that a scheduled LTE downlink is on a band associated with potential interference, including bands 7, 38, 40 and 41. Alternatively, coexistence manager 226 may be configured to determine whether the scheduled downlink is on a band associated with an increased risk of interference, such as band 40 or another frequency associated with a reduced guard band. After determining the scheduled downlink is on a frequency band of interest, coexistence manager 226 may predict the second period of potential interference based on the expected quality of the LTE downlink, as determined from at least one of the transmission power and the LTE performance indicator being employed. In one aspect, relatively higher transmission powers being employed by ISM module 210 may be associated with an increased risk of interference. In another aspect, relatively strong LTE reception, such as indicated by RSSI, may be associated with a reduced risk of interference. Coexistence manager 226 may predict the second period when one or both criteria meet appropriate thresholds, as desired. If the scheduled LTE downlink is not on a frequency band of interest, or if the LTE downlink is not expected to be desensitized by ISM module 210 transmission, the routine may exit as indicated by 414. Alternatively, upon predicting the second period of potential interference during an upcoming LTE transmission due to ISM aggressor interference, coexistence manager 226 may adjust a transmission duration of ISM module 210 to avoid transmitting with ISM module 210 during the second period, as indicated by 416.

Figure 5:
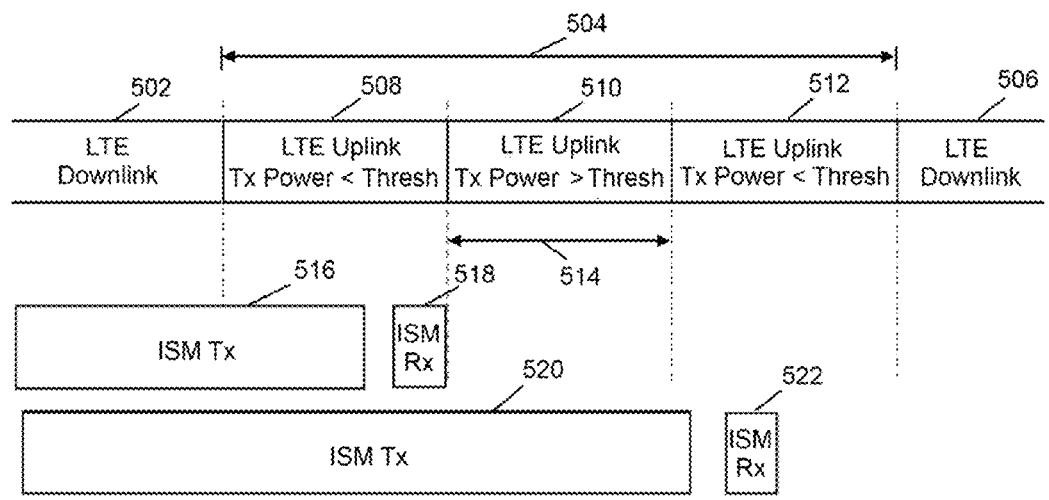
FIG. 5 is a timing diagram showing relative operational scheduling of LTE and ISM transceivers, according to one embodiment.
Figure 6:
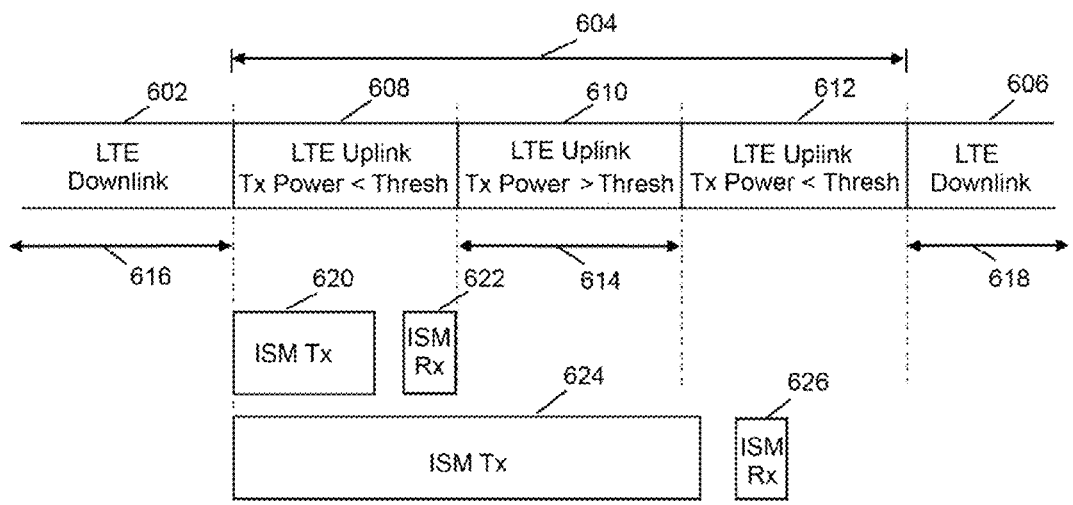
FIG. 6 is a timing diagram showing relative operational scheduling of LTE and ISM transceivers, according to another embodiment.

Examples to help illustrate various aspects of this disclosure are illustrated in FIGS. 5 and 6. Beginning with FIG. 5, a timing diagram shows relative operational scheduling of LTE module 202 and ISM module 210. LTE operation includes alternating downlink 502, 506 and uplink 504 frames. Further, uplink frame 504 may include one or more subframes, such as subframes 508, 510 and 512. First, coexistence manager 226 may determine that the LTE operation is on a frequency band associated with a potential for interference. In these examples, such frequency bands may include bands 7, 38, 40 and 41. However, in other applications, different frequency bands may be appropriate. If the frequency band is associated with potential interference, coexistence manager 226 may identify a first period 514 of potential ISM victim interference when the transmission power allocated to uplink subframe 510 exceeds the predetermined threshold. Time periods associated with subframes 508 and 512 may not be included in first period 514 if the transmission power allocated in those subframes is below the threshold. In turn, coexistence manager 226 may adjust the duration of an ISM module 210 transmission so that a response to the transmission is not triggered during first period 514. The ISM transmission 516 may have a duration such that the response indicated by ISM reception 518 terminates at a time prior to the end of subframe 508 and the start of first period 514. Alternatively ISM transmission 520 may have a duration such that the response indicated by ISM reception 522 begins after the beginning of subframe 512 and the end of first period 514.

The nature of ISM reception 518 and 522 may be determined based upon the wireless protocol being employed by ISM module 210. In a WLAN embodiment, discussed below, ISM transmissions 516 and 520 may be aggregate 802.11 frames and ISM receptions 518 and 522 may be a block acknowledgment (BA). The timing and duration of ISM receptions 518 and 522 may also be determined based, at least in part, on the wireless protocol. For example, a BA may have a duration that is correlated with the characteristics of the aggregate frame transmission and may be sent after a short interframe space (SIFS) following the end of the aggregate frame transmission. In general, ISM receptions 518 and 522 may be any communication having predictable characteristics that is triggered by the corresponding ISM transmission 516 and 520, respectively.

Similar to the example shown in FIG. 5, FIG. 6 is a timing diagram showing relative operational scheduling of LTE module 202 and ISM module 210. Again, LTE operation may include alternating downlink frame 602, uplink frame 604, and downlink frame 606, with uplink frame 604 including subframes 608, 610 and 612. Upon determination that LTE operation is on a frequency band associated with a potential for interference, coexistence manager may identify a first period 614 of potential ISM victim interference when the transmission power allocated to uplink subframe 610 exceeds the predetermined threshold. Additionally, coexistence manager 226 may also identify a second period 616 or 618 of potential ISM aggressor interference. In one aspect, coexistence manager 226 may be configured to identify a second period when LTE operation is scheduled on any of the frequency bands associated with potential interference. In another aspect, coexistence manager 226 may identify the second period when the LTE operation is scheduled on a frequency band associated with an increased potential for interference, such as band 40. The determination of increased potential for interference may be based on the existence of a relatively reduced guard band or any other suitable criteria.

As discussed above, when coexistence manager 226 is configured to identify the second period corresponding to potential ISM aggressor interference, such as when LTE operation is occurring on band 40, the prediction may be based at least in part on the expected quality of LTE reception. As described above, quality of LTE reception may be determined based on at least one of the transmission power at which ISM module 210 is operating and an LTE reception performance metric, such as RSSI. If these factors indicate LTE reception may be desensitized by ISM transmission in second periods 616 and 618, coexistence manager 226 may adjust the duration of ISM transmissions such that they do not begin during the second periods 616 or 618. For example, ISM transmission 620 may have a duration such that it begins following LTE downlink 602 and second period 616 and such that ISM reception 622 terminates at a time prior to the end of subframe 608 and the start of first period 614. Alternatively ISM transmission 624 may have a duration such that it begins following LTE downlink 602 and second period 616 and such that the ISM reception 626 begins after the beginning of subframe 612 and the end of first period 614.

When employing a wireless protocol such as defined in one of an IEEE 802.11 standard, transmissions may be organized into discrete units of information. Information is packetized at an upper level of the wireless protocol stack, such as the network layer. As the information is passed to the data link layer, the packets or datagrams may be organized into frames having a defined format. In one aspect, information received at the MAC sublayer of the data link layer may be organized in MAC service data units (MSDUs). The MAC layer may wrap each MSDU in a MAC header to form a MAC protocol data unit (MPDU) that is delivered to the physical (PHY) layer. In turn, the PHY layer wraps the MPDU in a PHY layer convergence protocol (PLCP) header to form a PLCP protocol data unit (PPDU) which may be modulated and transmitted over the wireless medium. To reduce the framing overhead, multiple frames may be aggregated into a single wrapper. At the MSDU level, multiple MSDU frames may be grouped to form an aggregate MSDU (A-MSDU), which may then be wrapped with a single MPDU header. Similarly, at the MPDU level, multiple MPDU frames may be grouped to form an aggregate MPDU (A-MPDU), requiring only one PCLP header. Accordingly, the aggregation of frames reduces the number of protocol headers and leads to a decrease in overhead.

In response, a receiving station may transmit an acknowledgement (ACK) for each MPDU successfully received. To accommodate the multiple frames transmitted in an aggregate frame, the receiving stations may employ the BA process noted above. Rather than transmitting an individual ACK for every frame, the success or failure of multiple frames addressed to a given station may be acknowledged with a BA frame, having a bitmap indicating the success or failure of reception of each frame. The PHY and MAC layers of the transmitter employ the ACK and BA communications to identify frames that were not successfully received and may require retransmission.

Figure 7:
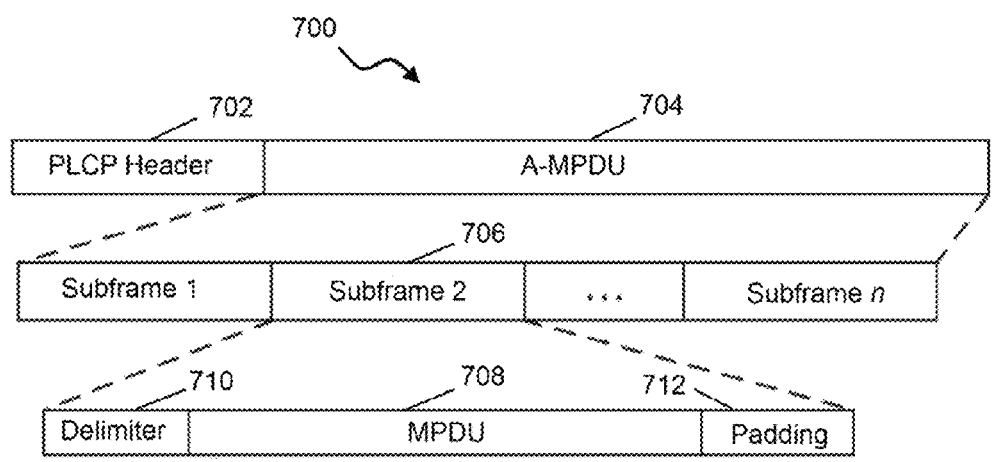
FIG. 7 is a schematic representation of a format of an A-MPDU aggregate frame.

An exemplary format of a PPDU formed from an A-MPDU is depicted in FIG. 7. As shown, PPDU 700 includes PLCP header 702 and A-MPDU frame body 704, which includes subframes 1 through n. Further, each subframe includes an MPDU so that A-MPDU frame body 704 has n MPDUs. For example, Subframe 2 706 is formed from MPDU 708 and bounded by delimiter 710 and padding 712 as warranted to align with an interleaved symbol boundary.

As such, techniques of this disclosure may include adjusting the number n of MPDUs or MSDUs to achieve a desired ISM module 210 transmission duration such that the responding BA does not arrive during the first period corresponding to potential ISM victim interference predicted by coexistence manager 226. Further, adjusting the duration of the ISM transmission duration may also include scheduling a start time for the transmission that does not fall within the second period corresponding to potential ISM aggressor interference predicted by coexistence manager 226. Under current standards, an A-MPDU may contain 64 MPDUs and n may be selected as an integer from 1 to 64, although the techniques of this disclosure are not limited in this respect.

In other embodiments, the characteristics of ISM transmissions and any predicted responses may be determined from the wireless protocol being employed. Similarly, any suitable approach for adjusting the duration of the ISM transmission may be employed as appropriate. For example, the duration of a Bluetooth transmission may be dynamically adjusted to obtain the benefits of this disclosure.

Described herein are presently preferred embodiments. However, one skilled in the art will understand that the principles of this disclosure can be extended easily with appropriate modifications to other applications.

What is claimed is:

1. A wireless communications device, comprising:
  a first transceiver configured to operate using a first wireless protocol:
  a second transceiver configured to operate using a second wireless protocol; and
  a coexistence manager configured to:
    receive an allocation of network resources using the first transceiver;
    identify a first period of potential interference regarding an upcoming transmission using the first transceiver based, at least in part, on a characteristic determined from the allocation of network resources; and adjust a nonzero transmission duration of the second transceiver so that a response, triggered by a transmission using the second transceiver, does not arrive during the first period of potential interference.

2. The wireless communications device of claim 1, wherein the characteristic is an allocated transmission power of the first transceiver.

3. The wireless communications device of claim 2, wherein the first period of potential interference corresponds to the upcoming transmission of an uplink subframe when the allocated transmission power of the first transceiver is greater than a predetermined threshold.

4. The wireless communications device of claim 1, wherein the allocation of network resources is a resource block (RB) assignment.

5. The wireless communications device of claim 1, wherein the coexistence manager is further configured to:
predict a quality of reception using the first transceiver,
identify a second period of potential interference regarding an upcoming reception using the first transceiver when the predicted quality of reception is below a predetermined threshold; and
adjust the nonzero transmission duration of the second transceiver so that the transmission using the second transceiver does not begin during the second period of potential interference.

6. The wireless communications device of claim 5, wherein the coexistence manager is to predict the quality of reception based, at least in part, on at least one of a transmission power of the second transceiver and a receive performance metric of the first transceiver.

7. The wireless communications device of claim 5, wherein the coexistence manager is to identify the first period of potential interference when the allocation of network resources indicates that the first transceiver is to operate on a first frequency band of a first set of frequency bands having a potential for interference, and to identify the second period of potential interference when the allocation of network resources indicates that the first transceiver is to operate on a second frequency band of a second set of frequency bands having a potential for interference, wherein the first set of frequency bands and the second set of frequency bands each include at least one frequency band.

8. The wireless communications device of claim 7, wherein the second set of frequency bands is a subset of the first set of frequency bands.

9. The wireless communications device of claim 1, wherein the first wireless protocol is a long term evolution (LTE) protocol and wherein the second wireless protocol is a wireless local area network (WLAN) protocol.

10. The wireless communications device of claim 9, wherein the coexistence manager is to adjust the nonzero transmission duration of the second transceiver by varying a number of aggregated frames in the transmission.

11. The wireless communications device of claim 1, further comprising:
means for predicting a quality of reception using the first transceiver,
means for identifying a second period of potential interference regarding an upcoming reception using the first transceiver when the predicted quality of reception is below a predetermined threshold; and
means for adjusting the transmission duration of the second transceiver so that the transmission does not begin during the second period.

12. A method for providing coexistence between a first wireless protocol and a second wireless protocol, comprising:
receiving an allocation of network resources using the first wireless protocol;
identifying a first period of potential interference regarding an upcoming transmission using the first wireless protocol based, at least in part, on a characteristic determined from the allocation of network resources; and
adjusting a nonzero transmission duration of the second wireless protocol so that a response, triggered by a transmission using the second wireless protocol, does not arrive during the first period of potential interference.

13. The method of claim 12, wherein the characteristic is an allocated transmission power of the first wireless protocol.

14. The method of claim 13, wherein the first period of potential interference corresponds to the upcoming transmission of an uplink subframe when the allocated transmission power of the first wireless protocol is greater than a predetermined threshold.

15. The method of claim 12, wherein the allocation of network resources is a resource block (RB) assignment.

16. The method of claim 12, further comprising:
predicting a quality of reception using the first wireless protocol,
identifying a second period of potential interference regarding an upcoming reception using the first wireless protocol when the predicted quality of reception is below a predetermined threshold; and
adjusting the nonzero transmission duration of the second wireless protocol so that the transmission does not begin during the second period of potential interference.

17. The method of claim 16, wherein predicting the quality of reception is based, at least in part, on at least one of a transmission power of the second wireless protocol and a receive performance metric of the first wireless protocol.

18. The method of claim 16, wherein the first period of potential interference is identified when the allocation of network resources indicates that the first wireless protocol is to operate on a first frequency band of a first set of frequency bands having a potential for interference, and wherein the second period of potential interference is identified when the allocation of network resources indicates that the first wireless protocol is to operate on a second frequency band of a second set of frequency bands having a potential for interference, wherein the first set of frequency bands and the second set of frequency bands each include at least one frequency band.

19. The method of claim 18, wherein the second set of frequency bands is a subset of the first set of frequency bands.

20. The method of claim 12, wherein the first wireless protocol is a long term evolution (LTE) protocol and wherein the second wireless protocol is a wireless local area network (WLAN) protocol.

21. The method of claim 20, wherein adjusting the nonzero transmission duration of the second wireless protocol comprises varying a number of aggregated frames in the transmission.

22. A non-transitory processor-readable storage medium for providing coexistence between a first wireless protocol and a second wireless protocol in a wireless communications device, the non-transitory processor-readable storage medium storing instructions that, when executed by a processor, cause the wireless communications device to:
- receive an allocation of network resources using the first wireless protocol;
- identify a first period of potential interference regarding an upcoming transmission using the first wireless protocol based, at least in part, on a characteristic determined from the allocation of network resources; and
- adjust a nonzero transmission duration of the second wireless protocol so that a response, triggered by a transmission using the second wireless protocol, does not arrive during the first period of potential interference.

23. The non-transitory processor-readable storage medium of claim 22, wherein the characteristic is an allocated transmission power of the first wireless protocol.

24. The non-transitory processor-readable storage medium of claim 23, wherein the first period of potential interference corresponds to the upcoming transmission of an uplink subframe when the allocated transmission power of the first wireless protocol is greater than a predetermined threshold.

25. The non-transitory processor-readable storage medium of claim 22, wherein the allocation of network resources is a resource block (RB) assignment.

26. The non-transitory processor-readable storage medium of claim 22, further comprising instructions to cause the wireless communications device to:
- predict a quality of reception using the first wireless protocol,
- identify a second period of potential interference regarding an upcoming reception using the first wireless protocol when the predicted quality of reception is below a predetermined threshold; and
- adjust the nonzero transmission duration of the second wireless protocol so that the transmission does not begin during the second period of potential interference.

27. The non-transitory processor-readable storage medium of claim 26, wherein predicting the quality of reception is based, at least in part, on at least one of a transmission power of the second wireless protocol and a receive performance metric of the first transceiver.

28. The non-transitory processor-readable storage medium of claim 26, wherein the first period of potential interference is identified when the allocation of network resources indicates that the first wireless protocol is to operate on a first frequency band of a first set of frequency bands having a potential for interference, and wherein the second period of potential interference is identified when the allocation of network resources indicates that the first wireless protocol is to operate on a second frequency band of a second set of frequency bands having a potential for interference, wherein the first set of frequency bands and the second set of frequency bands each include at least one frequency band.

29. The non-transitory processor-readable storage medium of claim 28, wherein the second set of frequency bands is a subset of the first set of frequency bands.

30. The non-transitory processor-readable storage medium of claim 22, wherein the first wireless protocol is a long term evolution (LTE) protocol and wherein the second wireless protocol is a wireless local area network (WLAN) protocol.

31. The non-transitory processor-readable storage medium of claim 30, wherein adjusting the nonzero transmission duration of the second wireless protocol comprises varying a number of aggregated frames in the transmission.

32. A wireless communications device, comprising:
- a first transceiver configured to operate using a first wireless protocol;
- a second transceiver configured to operate using a second wireless protocol;
- means for receiving an allocation of network resources using the first transceiver;
- means for identifying a first period of potential interference regarding an upcoming transmission using the first transceiver based, at least in part, on a characteristic determined from the allocation of network resources; and
- means for adjusting a nonzero transmission duration of the second transceiver so that a response, triggered by a transmission using the second transceiver, does not arrive during the first period of potential interference.

* * * * *